US012565124B2

(12) United States Patent
Völkner et al.

(10) Patent No.: US 12,565,124 B2
(45) Date of Patent: Mar. 3, 2026

(54) SEAT RAIL

(71) Applicants:BROSE SITECH GMBH, Wolfsburg (DE); BROSE SITECH SP. Z O.O., Polkowice (PL)

(72) Inventors: Norbert Völkner, Wolfsburg (DE); Nicolas Becker, Lehre (DE); Gunnar Steffen, Wolfenbüttel (DE); Süleyman Semir, Tappenbeck (DE)

(73) Assignees: BROSE SITECH GMBH, Wolfsburg (DE); BROSE SITECH SP. Z O. O, Polkowice (PL)

( * ) Notice: Subject to any disclaimer, the term of this patent is extended or adjusted under 35 U.S.C. 154(b) by 182 days.

(21) Appl. No.: 18/554,436

(22) PCT Filed: Mar. 29, 2022

(86) PCT No.: PCT/EP2022/058265
§ 371 (c)(1),
(2) Date: Oct. 6, 2023

(87) PCT Pub. No.: WO2022/214356
PCT Pub. Date: Oct. 13, 2022

(65) Prior Publication Data
US 2024/0190302 A1 Jun. 13, 2024

(30) Foreign Application Priority Data

Apr. 8, 2021 (DE) ..................... 10 2021 108 767.8

(51) Int. Cl.
*B60N 2/07* (2006.01)
(52) U.S. Cl.
CPC .................................... *B60N 2/072* (2013.01)
(58) Field of Classification Search
CPC ............. B60N 2/072; B60N 2/06; B60N 2/07
(Continued)

(56) References Cited

U.S. PATENT DOCUMENTS 3,685,872 A * 8/1972 Babbs ................. B60N 2/0887
384/47
3,930,632 A * 1/1976 Shigeta ................. B60N 2/071
297/344.1
(Continued)

FOREIGN PATENT DOCUMENTS

DE 41 25 247 A1 1/1993
DE 10 2009 004 365 A1 7/2009
(Continued)

OTHER PUBLICATIONS

International Search Report of PCT/EP2022/058265, Jun. 17, 2022, 4 pages.

*Primary Examiner* — Jose V Chen
(74) *Attorney, Agent, or Firm* — Lewis Roca Rothgerber Christie LLP

(57) ABSTRACT

A seat rail (1) for connecting a vehicle seat (100) to a body of a vehicle. The seat rail (1) may have a seat rail profile which is produced by roll forming of sheet metal, the seat rail profile of the seat rail (1) having an accommodation cavity (11) for a sliding element (20) which can be displaced within the accommodation cavity (11) of the seat rail (1) in longitudinal extension within the seat rail (1), which is connected directly or indirectly to the vehicle seat (100), the seat rail profile having, in addition to the sheet-metal portions (11A, 11B, 11C, 11D, 11E, 11F) of the accommodation cavity (11) which form a first material layer, at least one upper and/or lateral reinforcing portion (12, 13) which is formed as at least one further second material layer which is produced by roll-forming and reinforces the accommodation cavity (11).

13 Claims, 2 Drawing Sheets

Figure 1:
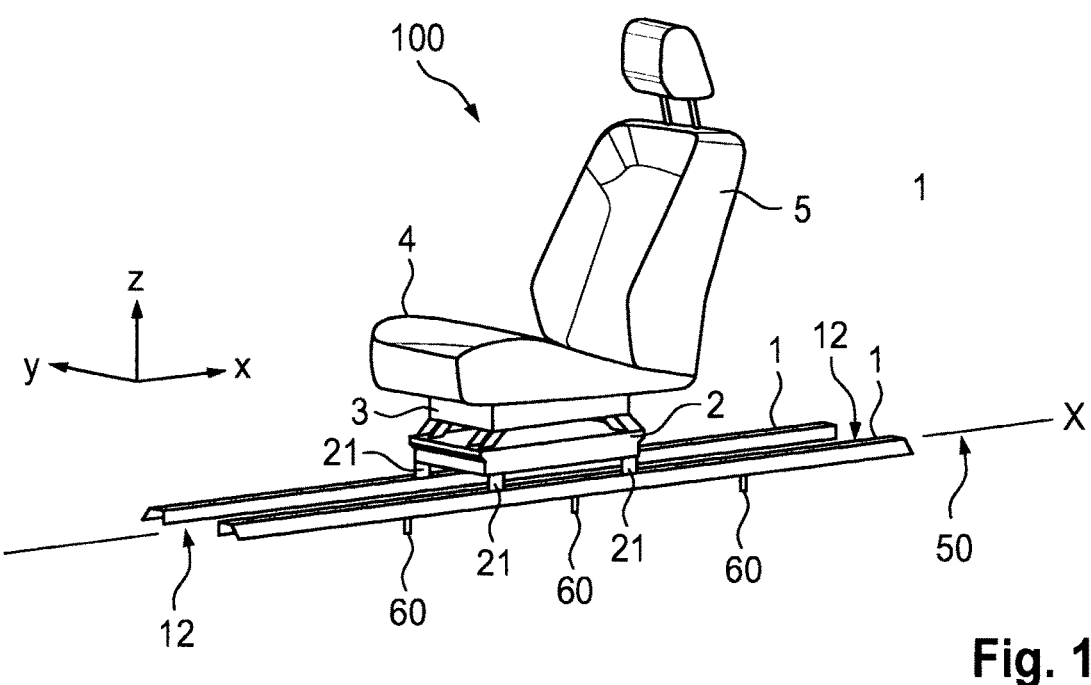

(58) Field of Classification Search
USPC .................................................... 297/344.1
See application file for complete search history.

(56) References Cited

U.S. PATENT DOCUMENTS

| | | | | |
|---|---|---|---|---|
| 4,483,504 A * | 11/1984 | Duwelshoft | ......... | B60N 2/0843 |
| | | | | 248/429 |
| 4,624,498 A * | 11/1986 | Nagashima | ............ | B60N 2/075 |
| | | | | 296/65.14 |
| 4,802,374 A | 2/1989 | Hamelin et al. | | |
| 5,167,393 A * | 12/1992 | Hayakawa | ............. | B60N 2/073 |
| | | | | 297/344.1 |
| 5,222,814 A * | 6/1993 | Boelryk | .................. | F16C 29/04 |
| | | | | 384/47 |
| 6,874,747 B2 * | 4/2005 | Oh | ........................ | B60N 2/0715 |
| | | | | 248/424 |
| 8,393,591 B2 * | 3/2013 | Mizuno | ................ | B60N 2/0705 |
| | | | | 248/424 |
| 9,102,245 B2 * | 8/2015 | Mischer | ............... | B60N 2/0725 |
| 2004/0124683 A1 * | 7/2004 | Matsumoto | .......... | B60N 2/0715 |
| | | | | 297/344.1 |
| 2006/0260424 A1 | 11/2006 | Becker et al. | | |
| 2010/0090083 A1 * | 4/2010 | Kojima | ................ | B60N 2/0725 |
| | | | | 248/429 |
| 2013/0075571 A1 * | 3/2013 | Suck | .................... | B60N 2/0705 |
| | | | | 248/430 |
| 2014/0239690 A1 * | 8/2014 | Yamada | ................... | B60N 2/07 |
| | | | | 297/344.1 |
| 2015/0367754 A1 * | 12/2015 | Walter | ................. | B60N 2/0705 |
| | | | | 297/344.1 |
| 2016/0068082 A1 * | 3/2016 | Schumann | ........... | B60N 2/0705 |
| | | | | 297/344.1 |
| 2017/0232870 A1 * | 8/2017 | Quast | ................... | B60N 2/0818 |
| | | | | 297/344.1 |
| 2019/0337471 A1 * | 11/2019 | Brehm | ................. | B60N 2/0244 |
| 2020/0086767 A1 * | 3/2020 | Ogasawara | .......... | B60N 2/0715 |
| 2021/0268939 A1 * | 9/2021 | Hao | ..................... | B60N 2/0705 |
| 2024/0351486 A1 * | 10/2024 | Zhao | ..................... | B60N 2/065 |
| 2025/0033536 A1 * | 1/2025 | Sprenger | ............... | B60N 2/072 |

FOREIGN PATENT DOCUMENTS

| | | | | |
|---|---|---|---|---|
| DE | 10 2011 050 268 A1 | 11/2011 | | |
| DE | 10 2010 063 615 A1 | 2/2012 | | |
| DE | 10 2012 005 875 A1 | 9/2013 | | |
| DE | 10 2016 008 379 A1 | 1/2018 | | |
| DE | 10 2019 206 313 A1 | 11/2019 | | |
| DE | 102010026214 B4 * | 6/2020 | ....... | B60R 21/01554 |
| WO | WO 2006/059405 A1 | 6/2006 | | |
| WO | WO 2020/006059 A1 | 1/2020 | | |

* cited by examiner

SEAT RAIL

CROSS-REFERENCE TO RELATED APPLICATION(S)

This application is a U.S. National Phase Patent Application of International Application Number PCT/EP2022/ 058265, filed on Mar. 29, 2022, which claims priority to German Patent Application Number 10 2021 108 767.8, filed on Apr. 8, 2021, the entire content of each of which is incorporated herein by reference.

The invention relates to a seat rail for connecting a vehicle seat to a body of a vehicle, the seat rail having a seat rail profile which is produced by roll-forming of metal sheets, the seat rail profile of the seat rail having an accommodation cavity for a sliding element which is displaceable within the accommodation cavity of the seat rail in longitudinal extension within the seat rail and which is connected directly or indirectly to the vehicle seat.

It is generally known that vehicle seats are arranged on rails or two rails, so-called pairs of rails, whereby, for example, the driver's or passenger's seat can be individually adapted and pushed further forwards or further backwards as required. The seat rail(s) can be used to move the entire driver's or passenger's seat further forward or backward in the passenger compartment of a vehicle. The seat is usually operated by means of a control lever. Depending on the vehicle type, the vehicle seat can usually even be pushed backwards to the back seat.

A conventional seat rail for vehicle seats comprises a bottom rail and a top rail that is slidable relative to the bottom rail, the bottom rail usually having holes for screws or other fasteners to secure the bottom rail to the vehicle floor.

In order to provide the user with the full range of comfort and safety, electric seat adjustment axles are a basic requirement. In addition to the standard seat length, seat height, backrest angle and headrest height adjustments, there is already the option of electrically adjusting the seat angle, seat depth, backrest width and backrest headrest angle, for example, or even the footrest.

The future of interior design, especially with regard to "autonomous driving", leads in visionary models to the realisation of automated seat adjustments in variable seating systems in particular, in which, for example, four or more swivelling lounge vehicle seats can be arranged in different positions. In future, all four or more than four passengers will be able to use their time in the vehicle for working, relaxing or communicating, wherein in particular the typical rigid arrangement of vehicle seats in rows of seats will be more and more dissolved. In other words, the longitudinal adjustment of vehicle seats in vehicles in particular must be possible across several rows of seats in the future.

In addition, the vehicle seats are no longer equipped—as before—with safety belt systems that are designed as belt systems attached to the body, but that belt integral systems are used that are assigned to the vehicle seats, whereby the forces are increasingly introduced into the structures holding the vehicle seat, in particular the seat rails.

In summary, it is therefore important in the development of seat rails that in the future it should be possible to adjust the seat length across several rows of seats and that the seat rails can absorb high forces.

The following publications illustrate the general technological background: DE 41 25 247 A1, DE 10 2009 004 365 A1, DE 10 2012 005 875 A1, US 2006/0 260 424 A1 and U.S. Pat. No. 4,802,374 A.

DE 41 25 247 A1 describes a seat rail which, when reaching or exceeding a limit load due to external forces, as occurs for example in a rear-end collision, reliably prevents a displacement in the adjustment direction of the guide device in any adjustment position without the use of additional active locking mechanisms. As a result of the positive and frictional interlocking of the profiled surface structures of the positive locking elements, all or a significant part of the forces acting on the seat rail, in particular the crash forces, are absorbed and the associated overload energy is dissipated.

A typical motorised seat length adjustment device can be found in DE 10 2009 004 365 A1. The seat length adjustment device comprises a pair of seat rails. Each pair of rails has a seat top rail and a bottom rail. The bottom rail is designed in a known manner to be attached to a floor assembly of a motor vehicle. The two seat top rails are movable in an adjustment direction relative to the floor rails and support the vehicle seat. An adjustment gear is accommodated in each seat top rail of the pair of rails. In this publication, the adjustment gear has a rotationally fixed spindle and a spindle nut that engages with the spindle.

Such spindle gears are known, for example, from US 2006/0260424 A1 and U.S. Pat. No. 4,802,374 A. It is explained in detail how the seat length adjustment takes place.

DE 10 2012 005 875 A1 describes a seat rail for connecting a vehicle seat to a floor of an associated motor vehicle. The seat rail is designed as a cold-rolled seat rail or as a roll-formed hollow rail and has knurling on a connecting surface that comes into contact with the vehicle seat.

The aforementioned state of the art makes it clear that, according to the description in DE 41 25 247 A1, it is ensured that high forces can be absorbed, in particular through the choice of the profile geometry of the guide rail and the slide rail, wherein the design focuses in particular on the load case "crash". In order to fulfil its function, the seat rail has several components (a guide rail, a slide rail and several positive-locking elements) which are combined to form a seat rail.

The publications DE 10 2019 206 313 A1, DE 10 2016 008 379 A1, DE 10 2010 063 615 A1 and DE 10 2011 050 268 A1 are cited as further relevant prior art.

DE 10 2019 206 313 A1 discloses a seat rail for connecting a vehicle seat to a body of a vehicle, the seat rail having a seat rail profile, the seat rail profile of the seat rail having a accommodation cavity for a sliding element which can be displaced within the accommodation cavity of the seat rail in longitudinal extension within the seat rail, which is connected directly or indirectly to the vehicle seat, the seat rail profile having, in addition to the sheet-metal portions of the accommodation cavity forming a first material layer, at least one upper and/or lateral reinforcing portion which is formed as at least one further second material layer which reinforces the accommodation cavity. DE 10 2016 008 379 A1 discloses that a vertical part of a guide profile of a sliding seat guide—as a two-dimensionally deformed profile—is manufactured by means of favourable manufacturing processes, such as a roll forming process.

The invention is based on the task of designing a seat rail which can absorb the forces in all load cases, in particular in the critical load cases "front crash, side crash, rear crash", and which is subject to a high degree of freedom with regard to its length without deforming with regard to the magnitude of the forces which can be absorbed, so that in particular a single seat rail can extend through the entire interior of a vehicle, in order to enable a longitudinal adjustment of vehicle seats, in particular for the age of "autonomous driving" over several rows of seats, wherein the seat rail concept consisting of seat rails and vehicle seats arranged on the seat rails is to take into account that the longitudinal adjustment of the seats is effected by means of electrified drives which are constructively integrated into the seat rail concept. A cost-effective production of the seat rails with a large number of identical parts is also aimed for.

The starting point of the invention is a seat rail for connecting a vehicle seat to a body of a vehicle, the seat rail having a seat rail profile which is produced by roll-forming of metal sheets, the seat rail profile of the seat rail having an accommodation cavity for a sliding element which is displaceable within the accommodation cavity of the seat rail in longitudinal extension within the seat rail and which is connected directly or indirectly to the vehicle seat.

It is provided that the seat rail profile, in addition to the sheet-metal portions of the accommodation cavity forming a first material layer, advantageously has at least one upper and/or lateral reinforcing portion which is formed as at least one further second material layer produced by roll forming, which reinforces the accommodation cavity.

According to the invention, it is provided that the sheet-metal portions of the first material layers forming the accommodation cavity have an inner contour which is adapted to an outer contour of the sliding element, wherein the sliding element has a central web which, in the assembled state, engages through the guide slot of the seat rail, wherein cantilever arms and cantilever legs project from the central web, which are arranged at the end sides in sheet-metal portions provided for this purpose in the accommodation cavity, the cantilever arms and the cantilever legs each having projections at the end sides, the projections of the cantilever arms engaging in semicircular sheet-metal portions of the accommodation cavity, while the projections of the cantilever legs engage in U-shaped sheet-metal portions of the accommodation cavity.

Preferably, it is provided that the first layer of material is reinforced by the second material layer from the upper sheet-metal portions of the accommodation cavity directed towards the vehicle seat.

The second material layer is advantageously produced by roll forming. The second material layer is formed by at least one upper sheet-metal portion of the at least one reinforcing portion. The upper sheet-metal portion of the at least one reinforcing portion adjoins the upper sheet-metal portions of the accommodation cavity so that the material rigidity of the seat rail profile of the seat rail is increased by the two-layer structure formed in the upper region of the seat rail (which is formed by roll forming) of the seat rail.

It is further preferred that the first material layer of lateral sheet-metal portions of the accommodation cavity, which adjoin the upper sheet-metal portions, are also reinforced by at least one second material layer produced by roll forming.

It is provided that the first material layer is reinforced by at least one lateral sheet-metal portion, so that the material rigidity of the seat rail profile of the seat rail is additionally increased in an advantageous manner by the two-layer structure (formed by roll forming) of the seat rail in the lateral region of the seat rail.

A reinforcement of the seat rail can in principle be made by a two-layer sheet metal guide in the upper or lateral region of the seat rail.

Preferably, it is provided that the two-layer sheet metal guide is produced "roll-formed" in the upper and lateral regions of the seat rail so that, in a preferred embodiment of the invention, the lateral sheet-metal portions of the reinforcing portions of the second material layer adjoin the upper sheet-metal portions of the reinforcing portions.

According to the invention, it is further provided that, in an advantageous manner, at least one cavity is/are formed between the upper sheet-metal portions of the first material layer of the accommodation cavity directed towards the vehicle seat and the sheet-metal portions of the second material layer of the reinforcing portions, which form an additional reinforcement and a deformable passive deformation space.

In detail, at least one cavity is/are formed between the lateral sheet-metal portions of the first material layer of the accommodation cavity and the lateral sheet-metal portions of the second material layer of the reinforcing portions.

In other words, there may be one cavity or several cavities may be formed, which is/are arranged in the upper and/or lateral region of the seat rail.

It is preferably provided that the upper sheet-metal portions of the accommodation cavity directed towards the vehicle seat and the lateral sheet-metal portions of the accommodation cavity of the first material layer of the accommodation cavity are each arranged on both sides of a guide slot of the seat rail.

Preferably, the first reinforcement portion is formed on one side of the guide slot of the seat rail, which has at least the upper sheet-metal portion and also the lateral sheet-metal portion as the second material layer.

Furthermore, it is preferably provided that on another side of the guide slot of the seat rail the second reinforcement portion is formed, which comprises as a second material layer at least the upper sheet-metal portion and furthermore the lateral sheet-metal portion and furthermore the lower sheet-metal portion.

In other words, the structural strength of the seat rail, which is reduced by the necessary guide slot, is advantageously increased by the reinforcing portions so that, advantageously, the structural strength of the seat rail is sufficiently high for all load cases to avoid deformation.

In a further preferred embodiment, it is further provided that the second material layer of at least one of the sheet-metal portions of the reinforcing portion is connected by adhesive force to the first material layer of one of the sheet-metal portions of the accommodation cavity and/or the second material layer of at least one of the sheet-metal portions of the reinforcing portion is connected by adhesive force to the first material layer of one of the sheet-metal portions of the accommodation cavity, in particular welded by means of a weld seam, as also explained in more detail in the description with reference to the drawings in addition to the previously mentioned aspects of the invention.

The invention relates to the arrangement of the sliding element in the seat rail, wherein the sheet-metal portions of the first material layers forming the accommodation cavity have the inner contour which is adapted to the outer contour of the sliding element, wherein it is provided according to the invention that the sliding element has the central web, which, in the assembled state, engages through the guide slot of the seat rail, the cantilever arms and cantilever legs projecting from the central web and being arranged at the end sides in the sheet-metal portions provided for this purpose in the accommodation cavity, as is also described in detail in the description with reference to the drawings.

Figure 2:
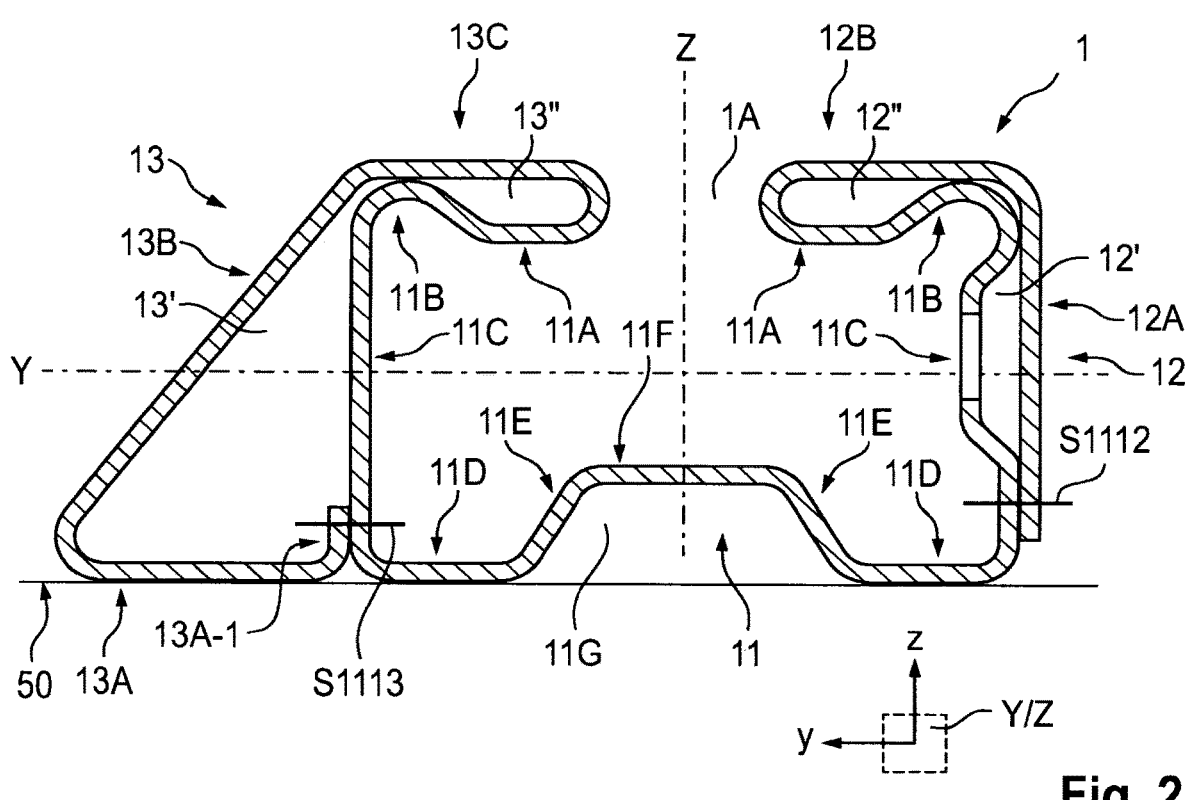
Figure 3:
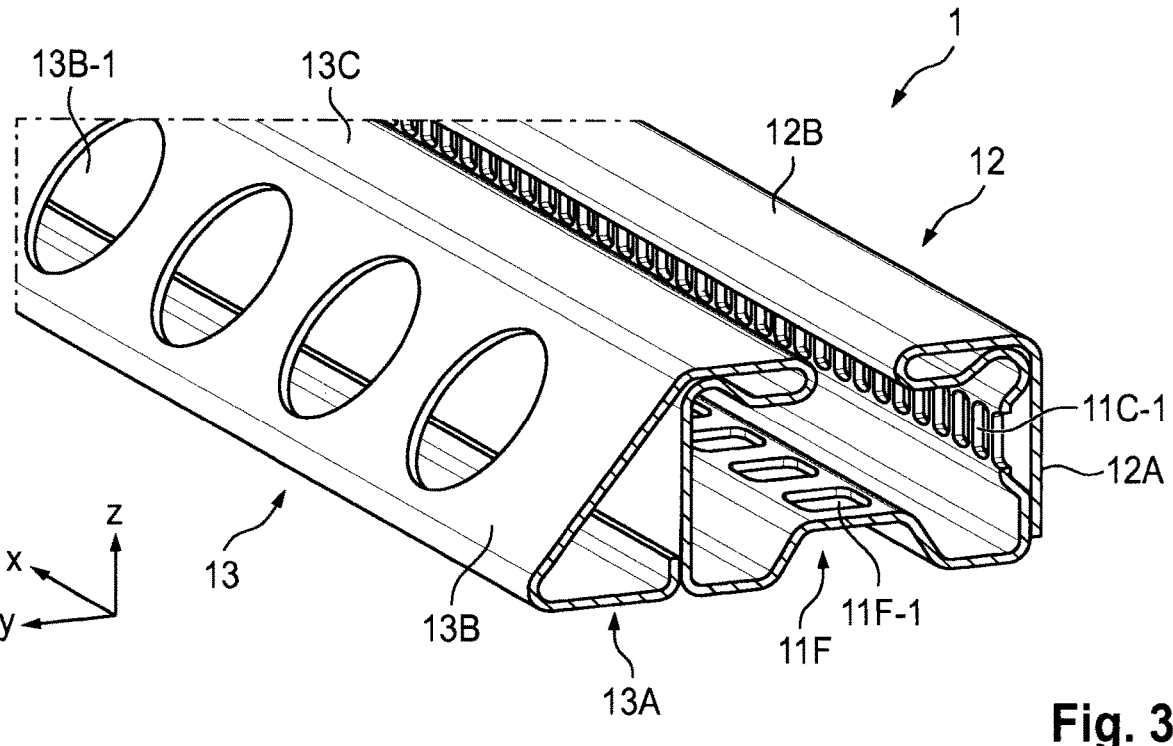
Figure 4:
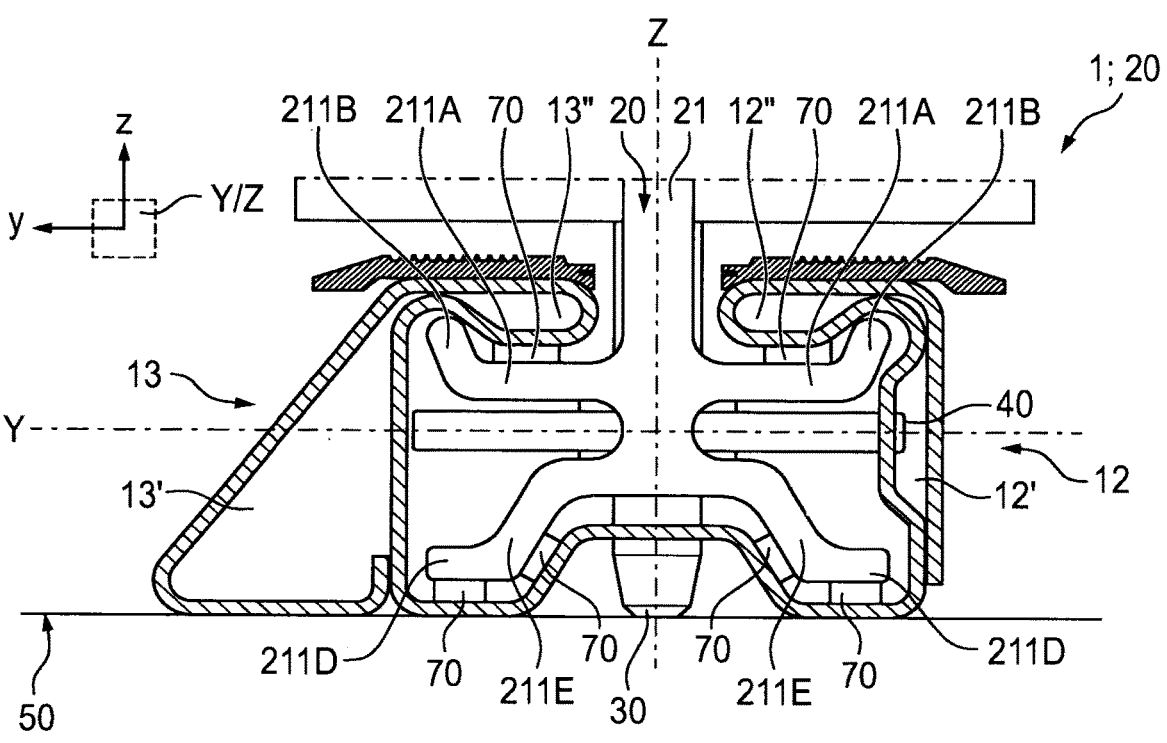

The invention is explained below with reference to the accompanying drawings. They show:

FIG. 1 a perspective view of a pair of seat rails consisting of two seat rails according to the invention;

FIG. 2 a Y/Z section through a seat rail of the pair of seat rails according to the invention to illustrate the seat rail profile;

FIG. 3 a perspective view of the seat rail according to the invention as shown in FIG. 2;

FIG. 4: a Y/Z section through the seat rail of the pair of seat rails according to the invention with a sliding element to illustrate the assembly state of the sliding element and the seat rail.

FIG. 1 shows a perspective view of a pair of seat rails being formed of two identically designed seat rails 1, 1 according to the invention.

These seat rails 1, 1 form the lower parts fixed to the body (as a pair of seat rails) of an adjustment and locking device for the longitudinal adjustment of a vehicle seat 100, which is also shown in FIG. 1. The vehicle seat 100 can be locked in a desired position by means of the adjustment and locking device, which is not shown in more detail, and can be adjusted manually or preferably electrically.

Longitudinally slidable elements are arranged in the seat rails 1, 1, which are referred to below as sliding elements on the vehicle seat side, wherein seat feet or seat rails or the like can be designed as sliding elements. The sliding element(s) will be discussed below. A sliding element is shown in FIG. 4 and marked with the reference sign 20.

In the embodiment example, the vehicle seat 100, which conventionally has a seat part-side seat structure 4 and a backrest-side seat structure 5, is connected to a carriage via a connecting structure 3. The connecting structure 3 is arranged between the carriage 2 and the seat part-side seat structure 4.

In the embodiment example, the carriage 2 has two web-like elements 21 each running vertically in the z-direction, each of which is connected to a sliding element 20, or the web-like elements 21 already form part of the sliding element 20, as will be explained later.

The essential aspects of the present invention relate to the design of the seat rails 1, 1 and the arrangement of the sliding elements 20 in the seat rails 1, 1, wherein a seat rail 1 and an associated sliding element 20 are explained below in isolation and in the assembled state.

As already explained, vehicle seats 100 will be used in the future that are designed as belt integral seats, whereby the forces are introduced more strongly into the structures holding the vehicle seat 100, in particular the seat rails 1, 1.

In order to enable the longitudinally slidable displacement in the sense of a repositioning of the seat belt integral vehicle seat over several, in particular two, three and possibly more rows of seats during the "autonomous driving" of a vehicle, it is further provided that the seat rails 1, 1 are very long and are designed in such a way that they can absorb the forces introduced into the seat rail structure via the seat belt integral vehicle seats.

A Y/Z section of a seat rail profile of a seat rail 1 of the pair of seat rails according to the invention is shown in FIG. 2.

The leaf plane as shown in FIG. 2 is defined as a Y/Z sectional plane, while the seat rail 1 runs in longitudinal extension x (compare the longitudinal axis X as shown in FIG. 1). At least one vehicle seat 100, i.e. several vehicle seats 100, in particular one or more belt-integral vehicle seat(s), can be arranged in such a seat rail 1 or a pair of seat rails.

It is understood that the pair of seat rails according to the invention can not only be used for belt integral vehicle seats, but can also be used independently thereof for vehicle seats which are equipped in a known manner with belt systems fixed to the body.

The special features of the seat rail 1 are illustrated in the Y/Z section of FIG. 2, wherein the seat rail 1 is described in a synopsis with the perspective view shown in FIG. 3.

In order that the seat rail 1 is not deformed or buckles in the y-direction (laterally horizontal) and also not in the z-direction (upwards vertical) in the load case, wherein according to an assumption for the design of the seat rail 1 a load case with a maximum occurring force is assumed, the seat rail profile has an accommodation cavity 11 in which the already explained sliding element 20 is arranged.

It is defined at the outset that the seat rail 1 is made in one piece and is manufactured using the roll forming process. In roll forming, a specially profiled profile is produced from a strip/sheet. The sheet metal is formed step by step by several pairs of rolls in succession—until the desired seat rail profile is achieved in the Y/Z section shown in FIG. 2. Low tool costs and high flexibility as well as length variability with only one tool characterise the technology of roll forming.

It is provided that a strip or sheet metal of high-strength material will be used.

The seat rail profile of the seat rail 1 is characterised by the fact that the accommodation cavity 11 has several sheet-metal portions.

The accommodation cavity 11 of the seat rail 1:

In the usage arrangement of the seat rail 1, the seat rail has a guide slot 1A in the upper region, which runs in the longitudinal extension x of the seat rail 1. The guide slot 1A is arranged on an upper side of the seat rail 1.

The inner contour of the accommodation cavity 11 of the seat rail profile comprises, in the upper region, first sheet-metal portions 11A which extend in the x-direction and are arranged in a horizontal x/y-plane and are formed as flat surfaces.

Semi-circular sheet-metal portions 11B, so-called undercuts, which also extend in the z-direction and are designed as semi-circular receiving spaces, adjoin these sheet-metal portions 11A on both sides.

Starting from these semicircular sheet-metal portions 11B, vertically aligned sheet-metal portions 11C adjoin on both sides, which are formed as vertical wall portions. The wall portions also run in the x-direction in the longitudinal extension x of the seat rail 1.

One of the two vertical wall portions forms an inwardly drawn bead that forms a cavity 12', which will be discussed further below.

The lower region of the inner contour of the accommodation cavity 11 is formed by a substantially U-shaped sheet-metal portion 11F, which is formed in a kind of bead that projects into the accommodation cavity 11, so that a free space 11G is formed below the U-shaped sheet-metal portion 11F, the function of which will be discussed later.

To each side of the U-shaped sheet-metal portion 11F, which forms a plateau lying in an x/y plane, U-shaped sheet-metal portions 11D thus also adjoin on both sides, between the vertical wall portions and the bead feet of the bead, which lie in the x/y body plane 50, which in turn extend in the z direction and are formed as U-shaped receiving spaces between the vertical wall portions and the plateau.

The surface between the plateau lying in an x/y plane and the bead feet is formed as a slope in each case and forms the sheet-metal portions 11E, the significance of which will be explained later.

Another essential aspect of the invention is that the seat rail profile comprises two reinforcing sheet-metal portions 12, 13 formed by roll forming.

The reinforcement sheet-metal portion 12 of the seat rail 1:

The reinforcing sheet-metal portion 12 is attached to the sheet-metal portion 11A. First, the sheet metal is bent 180° from the x/y plane of the sheet-metal portion 11A into a second x/y plane above it as sheet-metal portion 12B, so that, seen in the z-direction, a double-layered seat rail profile is formed, the sheet-metal portion 12B of which spans the sheet-metal portions 11A and 11B on the side of the reinforcing sheet-metal portion 12.

As a result, a cavity 12" is formed between the reinforcing layer of the sheet metal in the sheet-metal portion 12B and the sheet-metal portions 11A and 11B.

Starting from the sheet-metal portion 12B of the reinforcing sheet-metal portion 12, the sheet metal is angled 90° from the x/y plane into the x/z plane forming a further reinforcing layer in the sheet-metal portion 12A in a second x/z plane parallel to the sheet-metal portion 11C on the side of the reinforcing sheet-metal portion 12 which is also aligned in the x/z plane.

A further cavity 12' is formed between the sheet-metal portion 11C on the side of the reinforcing sheet-metal portion 12 and the sheet-metal portion 12A of the reinforcing sheet-metal portion 12 itself.

The sheet-metal portion 12A as a reinforcing layer of the sheet metal is preferably designed so long that it essentially completely covers the lateral region of the seat rail 1.

In the use arrangement of the seat rail 1, the reinforcement sheet-metal portion 12 of the seat rails 1, 1 forming the pair of seat rails is located on the inside in each case (compare FIG. 1 of the seat rails 1, 1).

The reinforcement sheet-metal portion 13 of the seat rail 1:

The reinforcing sheet-metal portion 13 attaches to the other sheet-metal portion 11A. First, the sheet metal is bent 180° from the x/y plane of the sheet-metal portion 11A into a second x/y plane above it as sheet-metal portion 13C, so that a double-layered seat rail profile is formed as seen in the z-direction, the sheet-metal portion 13C of which spans the sheet-metal portions 11A and 11B on the side of the reinforcing sheet-metal portion 13.

As a result, a cavity 13" is formed between the reinforcing layer of the sheet metal in the sheet-metal portion 13C and the sheet-metal portions 11A and 11B.

Starting from the sheet-metal portion 13C of the reinforcing sheet-metal portion 13, the sheet metal is angled at a predetermined angle from the x/y plane into an inclined plane and forms a further reinforcing layer in the sheet-metal portion 13B in the inclined plane which is at the predetermined angle to the sheet-metal portion 11C on the side of the reinforcing sheet-metal portion 13, the sheet-metal portion 11C being aligned in the x/z plane.

A further cavity 13' is formed between the sheet-metal portion 11B on the side of the reinforcing sheet-metal portion 13 and the sheet-metal portion 13B of the reinforcing sheet-metal portion 13 itself.

The sheet-metal portion 13B as a reinforcing layer of the sheet metal is preferably designed to be long enough to support substantially the entire lateral region of the seat rail 1, with the inclined plane of the sheet-metal portion 13B extending to x/y body plane 50.

There, the reinforcing sheet-metal portion 13 is angled a further time and forms the sheet-metal portion 13A so that the cavity 13' extending in the x-direction of the seat rail 1 is also enclosed with sheet metal in the x/y body plane 50, wherein it is provided that an angle is formed on the end side of the sheet-metal portion 13A, the formed-on leg 13A-1 of which is also formed in an x/y plane parallel to the sheet-metal portion 11D. The formed-on leg 13A-1 thus additionally forms a kind of support for the sheet-metal portion 11D on the side of the reinforcing sheet-metal portion 13.

In summary, the reinforcing sheet-metal portions 12, 13 thus form in the z-direction and y-direction transversely to the longitudinal extension x of the seat rail 1 in each case horizontally laterally y formed y-oriented cavities 12', 13' (connected with the two-layer structure of the sheet-metal portions) and to the left and right of the guide slot 1A vertically upwardly formed z-oriented cavities 12", 13" (connected with the two-layer structure of the sheet-metal portions), 13" (connected with the double-layered sheet-metal portions), which ensure that forces acting on the seat rail 1 from the z-direction and/or y-direction are absorbed to a greater extent than with conventional seat rails.

The connection by adhesive force of the reinforcing sheet-metal portions 12 and/or 13 of the seat rail 1 with the accommodation cavity 11:

FIG. 2 shows that in a preferred embodiment, the sheet-metal portion 11D on the side of the reinforcing sheet-metal portion 12 is connected by adhesive force, in particular welded, to the sheet-metal portion 12A of the reinforcing sheet-metal portion 12 itself.

In other words, the lateral reinforcing sheet-metal portion 12 is welded to at least one sheet-metal portion 11B, 11C, 11D of the structure of the accommodation cavity 11, wherein in the embodiment example the end of the reinforcing sheet-metal portion 12 is welded to the sheet-metal portion 11D. In other words, after roll forming, in a preferred embodiment the said sheet-metal portions are connected to each other, preferably by adhesive force, by means of a weld seam running in the longitudinal extension x of the seat rail 1.

FIG. 2 also shows that in a preferred embodiment, the sheet-metal portion 11D on the side of the reinforcing sheet-metal portion 13 is connected by adhesive force, in particular welded, to the leg 13A-1 of the reinforcing sheet-metal portion 13 itself.

In other words, the lateral reinforcing sheet-metal portion 13 is welded to at least one sheet-metal portion 11B, 11D of the structure of the accommodation cavity 11, wherein in the embodiment example the leg 13A-1 of the reinforcing sheet-metal portion 13 is welded to the sheet-metal portion 11D. In other words, after roll forming, in a preferred embodiment the said sheet-metal portions are connected to one another, preferably by adhesive force, by means of a weld seam running in the longitudinal extension x of the seat rail 1.

A seat rail 1 according to the invention thus has an accommodation cavity 11, at least one reinforcing sheet-metal portion 12, 13 and, in a preferred embodiment, at least one weld seam S1113 and/or S1112 (compare FIG. 2), which connects the accommodation cavity 11 to the respective reinforcing sheet-metal portion 12, 13.

With respect to a vertical Y-axis Z, the cavities 12", 13" and the sheet-metal portions 11B, 11B as well as the sheet-metal portions 11D, 11D are substantially mirror symmetrical.

In FIG. 3, the perspective view also shows that openings 13B-1 are arranged as access openings in the sheet-metal portion 13B of the reinforcing sheet-metal portion 13. These access openings serve to guide a tool, which engages substantially in the vertical direction z, through the access openings in order to be able to fasten the seat rail 1 on the side of the reinforcing sheet-metal portion 13 on the body side to the vehicle body in the x/y body plane 50 using fastening elements 60 (compare FIG. 1), the fastening elements 60 engaging through the sheet-metal portion 13A of the reinforcing sheet-metal portion 13. The reinforcement sheet-metal portion 13 is located in the outer accessible region in the usage arrangement of the respective seat rail 1 and can thus be connected to the body in a detachable manner, preferably in an easily accessible manner, by a worker.

In FIG. 3, the perspective illustration also shows that the sheet-metal portion 11F, i.e. the bead, also has openings which are formed as latching openings 11F-1, in which an exemplarily shown locking element 30 (compare FIG. 4) engages in a locking state. The locking element 30 is displaced into the free space 11G in the locking state and is withdrawn from this free space 11G in the unlocking state. It is possible that the seat length adjustment is performed by means of electrified drives, which will not be discussed in more detail in this patent application. However, it is clear that the seat rail 1 is prepared to receive at least one locking element 30 in a reversibly locking manner.

The seat rail 1 is further prepared to convert the adjustment movement of an adjusting element 40 provided with teeth (compare FIG. 4) in the manner of a gearwheel, which is preferably electrically driven, into a longitudinal adjustment movement in the x-direction. For this purpose, the sheet-metal portion 11C has openings, in particular gearwheel openings, on the side of the reinforcing sheet-metal portion 12, which extend over the entire length of the seat rail in the longitudinal direction x of the seat rail 1. In the assembled state, the teeth of the gearwheel engage in the gearwheel openings and a rotation of the gearwheel 40 leads to a translatory movement of the sliding element 20 in the respective seat rail 1.

The Sliding Element 20:

The sliding element 20 in the seat rail 1 is formed such that an inner contour of the accommodation cavity 11 is adapted to an outer contour of the sliding element 11 and vice versa.

The sliding element 20 has the centrally formed web-like element 21, which in the assembled state of the seat rail 1 with the sliding element 20 engages through the guide slot 1A.

The sliding element 10 has cantilever arms 211A and cantilever legs 211E in Y/Z section through the sliding element 20 and through the seat rail profile, which project from the centrally formed web-like element 21.

The cantilever arms 211A and cantilever legs 211E extend into the leaf plane as shown in FIG. 4 and have a certain length.

Between the cantilever arms 211A and cantilever legs 211E, the adjusting element 40 is rotatably arranged in the manner of a gear wheel.

The surfaces of the cantilever arms 211A directed towards the sheet-metal portions 11A of the accommodation cavity 11 and lying parallel form pairs of sliding surfaces with respective sliding elements 70 lying between them.

The ends of the cantilever arms 211A form bent projections 211B which, in the assembled state, engage in the semi-circular sheet-metal portions 11B so that the sliding element 20 is optimally guided in the z-direction and in the y-direction in the upper region of the accommodation cavity 11 and is supported in the load case.

The surfaces of the cantilever legs 211E directed towards the sheet-metal portions 11E of the accommodation cavity 11 and lying parallel also form pairs of sliding surfaces with sliding elements 70 lying between them, respectively, so that the sliding element 20 is slidingly supported on the sloping walls of the bead in the sheet-metal portion 11E.

The ends of the cantilevered legs 211E form bent projections 211D which, in the assembled state, engage in the U-shaped sheet-metal portions 11D so that the sliding element 20 is optimally guided in the z-direction and in the y-direction in the lower region of the accommodation cavity 11 and is supported in the load case.

The surfaces of the projections 211D directed towards the sheet-metal portions 11D of the accommodation cavity 11 and lying parallel also form pairs of sliding surfaces with sliding elements 70 located therebetween, so that the sliding element 20 is supported in a sliding manner in the vertical direction against the sheet-metal portion 11D of the U-shaped receiving cavities lying in the x/y plane.

It becomes clear that the seat rail/s 1, of a pair of seat rails are realised in a reinforced manner by a complex seat rail profile in such a way that a one-piece seat rail 1 can be guided over the entire vehicle interior (over several rows of seats). High-strength sheet metal or strips of high-strength material are used. The seat rail 1 is characterised by the geometry of the accommodation cavity 11 and the reinforcing sheet-metal portions, in particular the reinforcing sheet-metal portions 12, 13 forming hollow chambers, according to the invention.

Preferably, the weld seams S1112 and S1113 are laser weld seams which stiffen the seat rail in the lower region (between the material layer of the accommodation cavity 11 and the material layer of the reinforcing sheet-metal portions 12, 13) in such a way that the seat rail 1 as a whole can absorb very high forces before the seat rail 1 deforms at all, resulting in a high degree of safety for the occupant.

DE 10 2012 005 875 A1 already contains a seat rail in the form of a cold-rolled seat rail or a roll-formed hollow rail that has knurling on a connecting surface that comes into contact with the vehicle seat. This makes it possible to achieve increased energy absorption in the event of a crash.

The seat rail profile according to the invention goes far beyond the currently existing solution, since the seat rail 1 according to the invention has a substantially more complex seat rail profile, by means of which substantially higher forces can be absorbed in an advantageous manner due to its at least partially existing two-layer structure and/or the design of at least one cavity 12', 13'; 12", 13" of the accommodation cavity (11) and the reinforcing portions (12, 13).

LIST OF REFERENCE SIGNS

100 vehicle seat
1 seat rail
1A guide slot
2 carriage
3 connecting structure
4 seat part-side seat structure
5 backrest-side seat structure
11 accommodation cavity
11A upper sheet-metal portion
11B upper sheet-metal portion
11C lateral portion
11C-1 opening
11D lateral sheet-metal portion
11E lower sheet-metal portion
11F lower sheet-metal portion
11F-1 opening 12 reinforcing sheet-metal portion
12 cavity
12' cavity
12A lateral sheet-metal portion
12B upper sheet-metal portion
13 reinforcing sheet-metal portion
13 cavity
13" cavity
13A lower sheet-metal portion 13A
13A-1 leg
13B lateral sheet-metal portion
13B-1 opening
13C upper portion
20 sliding element
21 central web
211A
211B
211E cantilever arm
211 projection
211E cantilever legs
211 projection
30 locking element
40 adjusting element
50 vehicle body plane
60 fastening element
70 sliding elements
S1112 weld connection
S1113 weld connection
x longitudinal axis of the seat rail
Y horizontal axis transverse to the horizontal direction x
Z vertical axis
Y/Z sectional plane
x horizontal direction
y horizontal direction
Z vertical direction

The invention claimed is:

1. Seat rail (1) for connecting a vehicle seat (100) to a body of a vehicle, the seat rail (1) having a seat rail profile which is produced by roll-forming of sheet metal, the seat rail profile of the seat rail (1) having an accommodation cavity (11) for a sliding element (20) which is able to be displaced within the accommodation cavity (11) of the seat rail (1), in a longitudinal direction of the seat rail, within the seat rail (1), the sliding element (20) being connected directly or indirectly to the vehicle seat (100), the seat rail profile having, in addition to sheet-metal portions (11A, 11B, 11C, 11D, 11E, 11F) of the accommodation cavity (11) which form a first material layer, at least one upper and/or lateral reinforcing portion (12, 13) which is formed as at least one further second material layer which is produced by roll-forming and reinforces the accommodation cavity (11), characterised in that the sheet-metal portions (11A, 11B, 11C, 11D, 11E, 11F) of the first material layer forming the accommodation cavity (11) have an inner contour which is adapted to an outer contour of the sliding element (20), wherein the sliding element (20) has a central web (21) which, in an assembled state, engages through a guide slot (1A) of the seat rail (1), wherein cantilever arms (211A) and cantilever legs (211E) project from the central web (21), which are arranged at end sides in sheet-metal portions (11B, 11D) provided for this purpose in the accommodation cavity (11), the cantilever arms (211A) and the cantilever legs (211E) each having projections (211B, 211D) at end sides, wherein the projections (211B) of the cantilever arms (211A) engage in semicircular sheet-metal portions (11B) of the accommodation cavity (11), while the projections (211D) of the cantilever legs (211E) engage in U-shaped sheet-metal portions (11B) of the accommodation cavity (11).

2. Seat rail (1) according to claim 1, characterised in that the first material layer is reinforced by upper sheet-metal portions (11A, 11B) of the accommodation cavity (11) directed towards the vehicle seat (100) by the second material layer formed by at least one upper sheet-metal portion (12B, 13C) of the at least one a reinforcing portion (12, 13) adjoining the upper sheet-metal portions (11A, 11B) of the accommodation cavity (11), so that the material rigidity of the seat rail profile of the seat rail (1) is increased by the two-layered seat rail (1) formed in an upper region of the seat rail (1).

3. Seat rail (1) according to claim 2, characterised in that the first material layer of lateral sheet-metal portions (11C, 11D) of the accommodation cavity (11), which adjoin the upper sheet-metal portions (11A, 11B), is/are likewise reinforced by at least one second material layer, produced by roll-forming, of at least one lateral sheet-metal portion (12A, 13B), such that the material rigidity of the seat rail profile of the seat rail (1) is increased by the two-layer structure of the seat rail (1) formed in a lateral region of the seat rail (1).

4. Seat rail (1) according to claim 3, characterised in that at least one cavity (12', 13') is formed between the lateral sheet-metal portions (11C, 11D) of the first material layer of the accommodation cavity (11) and the lateral sheet-metal portions (12A, 13B) of the second material layer of the reinforcing portion (12, 13).

5. Seat rail (1) according to claim 2, characterised in that lateral sheet-metal portions (12A, 13B) of the reinforcing portion (12, 13) adjoin the upper sheet-metal portions (12B, 13C) of the reinforcing portion (12, 13).

6. Seat rail (1) according to claim 2, characterised in that at least one cavity (12", 13") is formed between the upper sheet-metal portions (11A, 11B), directed towards the vehicle seat (100), of the first material layer of the accommodation cavity (11) and the sheet-metal portions (12B, 13C) of the second material layer of the reinforcing portion (12, 13).

7. Seat rail (1) according to claim 1, characterised in that upper sheet-metal portions (11A, 11B) of the accommodation cavity (11) directed towards the vehicle seat (100) and lateral sheet-metal portions (11C, 11D) of the accommodation cavity (11) of the first material layer of the accommodation cavity (11) are each arranged on both sides of a guide slot (1A) of the seat rail (10).

8. Seat rail (1) according to claim 7, characterised in that on one side of the guide slot (1A) of the seat rail (1) a first reinforcement portion (12) is formed, which has as a second material layer at least an upper sheet-metal portion (12A) and also a lateral sheet-metal portion (12B).

9. Seat rail (1) according to claim 7, characterised in that on another side of the guide slot (1A) of the seat rail (1) a second reinforcing portion (13) is formed, which has as a second material layer at least an upper sheet-metal portion (13C) and in addition a lateral sheet-metal portion (13B) and in addition a lower sheet-metal portion (13A).

10. Seat rail (1) according to claim 1, characterised in that the second material layer of at least one of the sheet-metal portions (12A, 12B) of a reinforcing portion (12) is connected by adhesive force to the first material layer of one of the sheet-metal portions (11A, 11B) of the accommodation cavity (11) and/or the second material layer of at least one of the sheet-metal portions (13A, 13C) of a reinforcing portion (13) is connected by adhesive force to the first material layer of one of the sheet-metal portions (11C, 11D)

of the accommodation cavity (11), in particular welded by means of a weld seam (S1112, S1113).

11. Arrangement of a sliding element (20) in a seat rail (1) according to claim 1, wherein the sheet-metal portions (11A, 11B, 11C, 11D, 11E, 11F) of the first material layer forming the accommodation cavity (11) have an inner contour which is adapted to an outer contour of the sliding element (20), characterised in that in that the sliding element (20) has a central web (21) which, in an assembled state, engages through the guide slot (1A) of the seat rail (1), with cantilever arms (211A) and cantilever legs (211E) projecting from the central web (21) and being arranged at the end sides in sheet-metal portions (11B, 11D) provided for this purpose in the accommodation cavity (11), and the cantilever arms (211A) and the cantilever legs (211E) each have projections (211B, 211D) at end sides, the projections (211B) of the cantilever arms (211A) engaging in semicircular sheet-metal portions (11B) of the accommodation cavity (11), while the projections (211D) of the cantilever legs (211E) engage in U-shaped sheet-metal portions (11B) of the accommodation cavity (11).

12. Arrangement according to claim 11, characterised in that the sliding element (20) is mounted in a longitudinally slidable manner in the seat rail (1) via sliding elements (70), wherein pairs of sliding surfaces are formed between an inner side of upper sheet-metal portion (11A) of the accommodation cavity (11) and the cantilever arms (211A), and pairs of sliding surfaces are formed between an inner side of a lower sheet-metal portion (11E) of the accommodation cavity (11) and the cantilever legs (211E), and between an inner side of U-shaped sheet-metal portion (11D) of the accommodation cavity and the projections (211D) of the cantilever legs (211E).

13. Arrangement according to claim 11, characterised in that, viewed along a longitudinal direction of the central web (21), an adjusting element (40) is arranged between the cantilever arms (211) and the cantilever legs (211E), which engages in a lateral sheet-metal portion (11C) of the accommodation cavity (11), whereby an adjusting movement of the adjusting element (40) results in a displacement of the sliding element (20) relative to the stationary seat rail (1) in the longitudinal direction of the seat rail (1).

* * * * *